United States Patent
Contreras et al.

(10) Patent No.: US 7,177,107 B2
(45) Date of Patent: Feb. 13, 2007

(54) PREAMPLIFIER CIRCUIT WITH SIGNAL INTERFERENCE CANCELLATION SUITABLE FOR USE IN MAGNETIC STORAGE DEVICES

(75) Inventors: John Thomas Contreras, Palo Alto, CA (US); Klaas Berend Klaassen, San Jose, CA (US); Jacobus Cornelis Leonardus Van Peppen, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 386 days.

(21) Appl. No.: 10/777,620

(22) Filed: Feb. 11, 2004

(65) Prior Publication Data

US 2005/0174669 A1  Aug. 11, 2005

(51) Int. Cl.
*G11B 5/02* (2006.01)
*G11B 5/09* (2006.01)

(52) U.S. Cl. .......................................... 360/67; 360/46
(58) Field of Classification Search ...................... None
See application file for complete search history.

(56) References Cited

U.S. PATENT DOCUMENTS

| | | | |
|---|---|---|---|
| 4,514,828 A | 4/1985 | Closson et al. | |
| 4,577,240 A * | 3/1986 | Hedberg et al. | 360/22 |
| 5,420,736 A | 5/1995 | Heim et al. | |
| 5,426,542 A | 6/1995 | Smith | |
| 5,523,898 A * | 6/1996 | Jove et al. | 360/66 |
| 5,825,595 A * | 10/1998 | Gill | 360/314 |
| 5,856,891 A | 1/1999 | Ngo | |
| 6,031,273 A | 2/2000 | Torok et al. | |
| 6,341,046 B1 | 1/2002 | Peterson | |
| 6,538,832 B1 | 3/2003 | Ranmuthu et al. | |

* cited by examiner

*Primary Examiner*—Wayne Young
*Assistant Examiner*—Daniell L. Negrón
(74) *Attorney, Agent, or Firm*—John J. Oskorep, Esq.; Patrick Duncan

(57) ABSTRACT

In one illustrative example disclosed, a magnetic storage device includes at least one magnetic disk; a magnetic head which includes first and second read sensors; a suspension which supports the magnetic head relative to the magnetic disk; and read circuitry which includes a preamplifier. The preamplifier has a first input port coupled to the first read sensor; a second input port coupled to the second read sensor; a first bias source coupled to the first input port for actively current/voltage biasing the first read sensor; a second bias source coupled to the second input port for zero biasing the second read sensor; and a subtractor having first and second inputs coupled to the first and the second input ports, respectively. The first input of the subtractor is provided with a first signal which includes a read sensor data signal and an interference signal, whereas the second input of the subtractor is provided with a second signal which includes the interference signal but not the read sensor data signal. Thus, an output of the subtractor provides a read sensor signal without the interference signal.

27 Claims, 5 Drawing Sheets

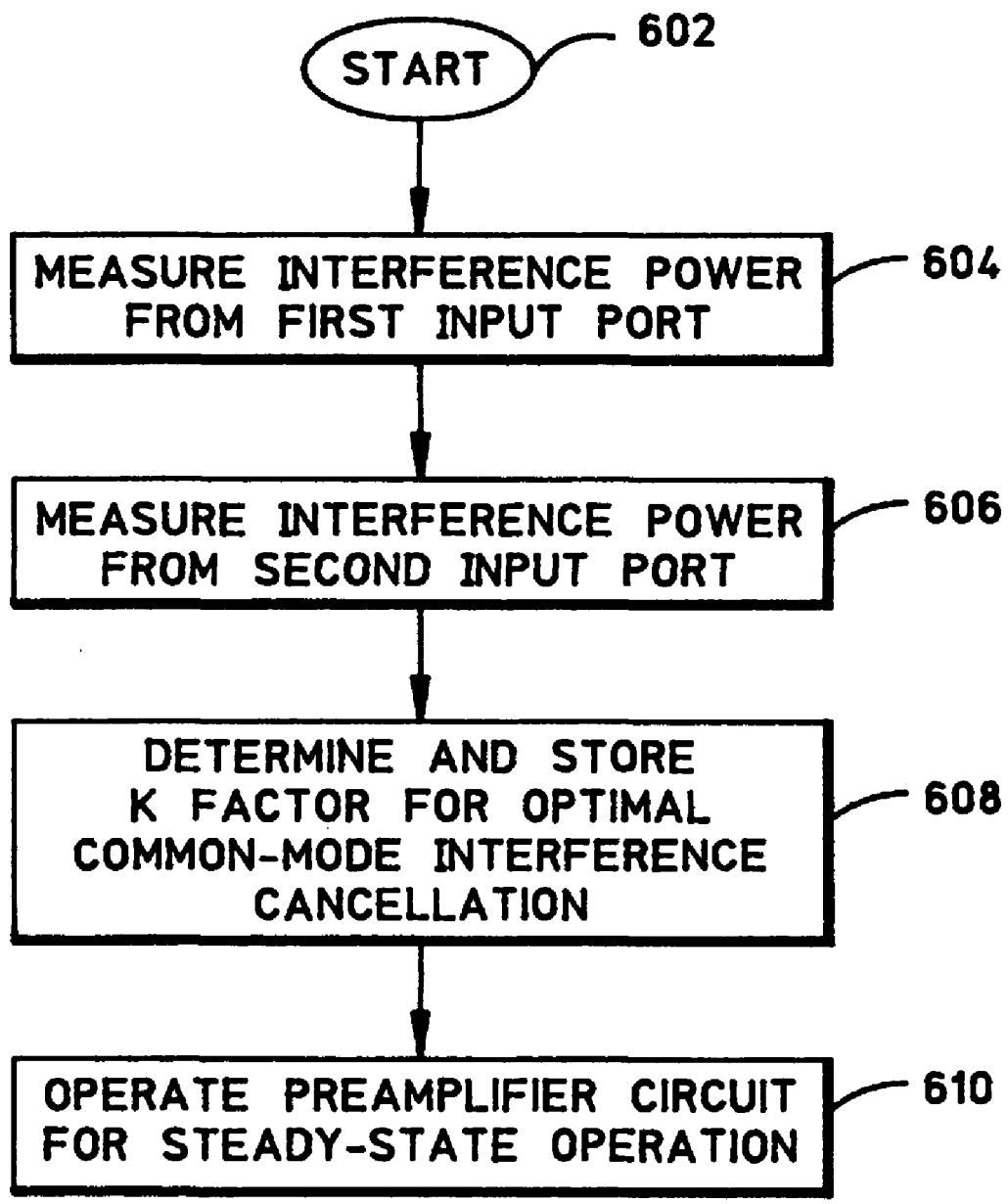

PREAMPLIFIER CIRCUIT WITH SIGNAL INTERFERENCE CANCELLATION SUITABLE FOR USE IN MAGNETIC STORAGE DEVICES

BACKGROUND OF THE INVENTION

1. Field of the Invention

The present invention relates generally to preamplifier circuits, and more particularly to preamplifier circuitry with signal interference cancellation suitable for use in magnetic storage devices.

2. Description of the Related Art

A magnetic storage device (such as a disk drive) typically includes a magnetic disk, a spindle motor which spins the magnetic disk, a magnetic head which has one or more read sensors, a read/write integrated circuit (R/W IC), and a suspension interconnect coupled between the read sensor and the R/W IC. The read sensor, such as a magnetoresistive (MR) sensor or a giant magnetoresistive (GMR) sensor, for example, is used for reading data from the disk. The read sensor is coupled to an input of the R/W IC, which generally includes read signal processing circuitry. The read signal processing circuitry biases the read sensor with a fixed direct current (DC) bias voltage or current, amplifies signals read from the disk, and may provide further processing of the amplified signals. The read sensor is coupled to the R/W IC through the suspension interconnect, which includes electrical conductors (e.g. copper alloy traces) primarily carried along an actuator arm.

The resistance of such read sensors changes in response to changing magnetic flux orientations on the magnetic disk. Changes in resistance of the read sensor translate into a varying analog electrical signal which is received and processed by the R/W IC. The processed analog signals are ultimately converted into digital data. In this general fashion, the magnetic storage device is able to read data from the disk at relatively high data rates (e.g. greater than 500 megabits per second (Mbs)). Unfortunately, without appropriate preamplifier circuitry in the read circuitry, too much interference may be picked up while reading the signals from the read sensor to the input of the read amplifier. The preamplifier circuitry typically amplifies low-level differential-mode readback data signals along with undesirable common-mode interference signals. Such interference ultimately affects the accuracy of the signals being read from the disk.

Interference signals are introduced from several different sources in the disk drive system. One such source is electronic circuitry that drives the spindle motor. Another source arises in the application environment for disk drives, such as Personal Computers (PCs), servers, and metal-rack supports. Finally, transmission line interference-coupling effects of the suspension interconnect, during high data rate operation, may undesirably influence the spectral content of the read signal.

One known solution for reducing common-mode interference signals in the read circuitry is the use of a differential circuit preamplifier. Differential circuits, however, have several drawbacks. For one, they consume a relatively large amount of power. Also, they occupy a relatively large area on the R/W IC. Finally, due to "floating inputs" (i.e. controlled near-ground potential), the front-end circuit has a relatively long transient recovery time. The following patents disclose the selection of a single read port and/or are differential circuit topologies: U.S. Pat. Nos. 5,859,564; 6,175,462; 5,323,278; and 5,444,579.

What is needed is an improved preamplifier circuit which reduces interference signals, especially in a disk drive environment.

SUMMARY

In one illustrative embodiment, a magnetic storage device includes at least one magnetic disk; a magnetic head which includes first and second read sensors; a suspension which supports the magnetic head relative to the magnetic disk; and read circuitry which includes a preamplifier. The preamplifier has a first input port coupled to the first read sensor; a second input port coupled to the second read sensor; a first current/voltage bias source coupled to the first input port for actively biasing the first read sensor; a second current/voltage bias source coupled to the second input port for zero biasing the second read sensor; and a subtractor having first and second inputs coupled to the first and the second input ports, respectively. The first input of the subtractor is provided with a first signal which includes a read sensor data signal and an interference signal; the second input of the subtractor is provided with a second signal which includes the interference signal but not the read sensor data signal. Thus, an output of the subtractor provides a read sensor signal without the interference signal. A gain of at least one of the amplifiers in the preamplifier circuit may be variable and controllably set to more accurately cancel the interference signal despite mismatches in component values.

BRIEF DESCRIPTION OF THE DRAWINGS

FIG. 6 is a flowchart which generally describes a method of reducing interference in a read sensor signal in a preamplifier circuit.

DETAILED DESCRIPTION OF THE PREFERRED EMBODIMENTS

The present invention described herein significantly reduces common-mode interference signals for single-ended multiple-input port preamplifiers. Singled-ended preamplifiers typically amplify common-mode interference signals along with low-level differential-mode signals from transducers. The interference signals can create errors in subsequent data processing. The present invention helps to reduce if not eliminate such errors in the subsequent processing.

Broadly, a multiple-input port preamplifier has a selected input port which is used to sense both a magnetic disk signal and a common-mode interference signal, and an unselected read port which is used to sense only the common-mode interference signal. Unselected input ports of the multiple-input port preamplifier will not have the transducer bias activated (i.e. it is zero-biased) and therefore will not be able to sense the magnetic disk signal. However, the unselected read port is still able to sense the common-mode interference signal. This common-mode interference signal is electronically subtracted from the desired magnetic disk signal sensed on the selected port. Thus, the common-mode interference signal is reduced if not eliminated from the desired magnetic disk signal.

Figure 1:
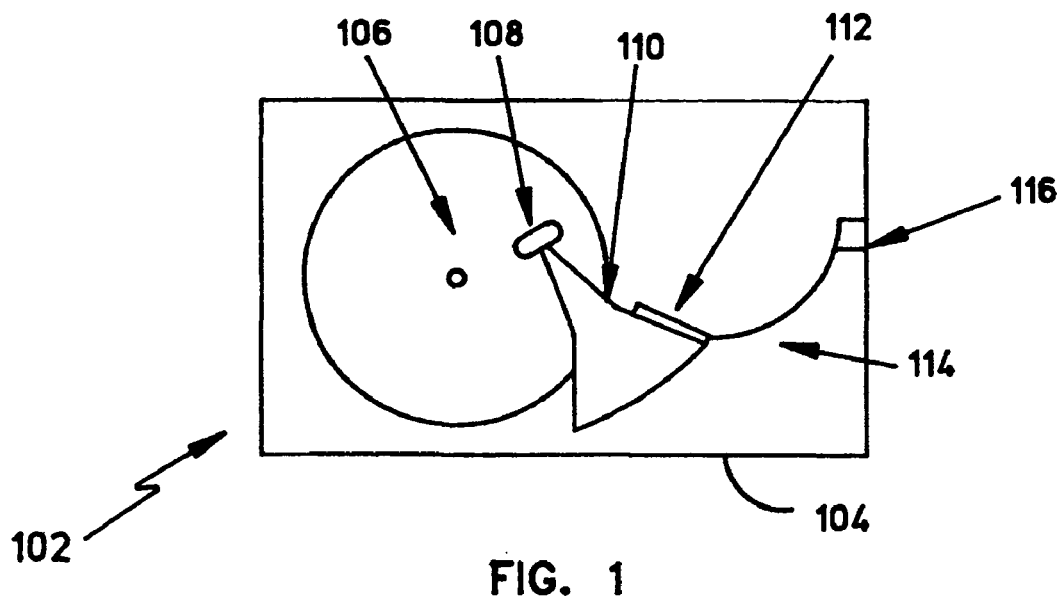
FIG. 1 is a simplified top down view of a magnetic storage device, which is one application in which the present invention may be employed.
Figure 2:
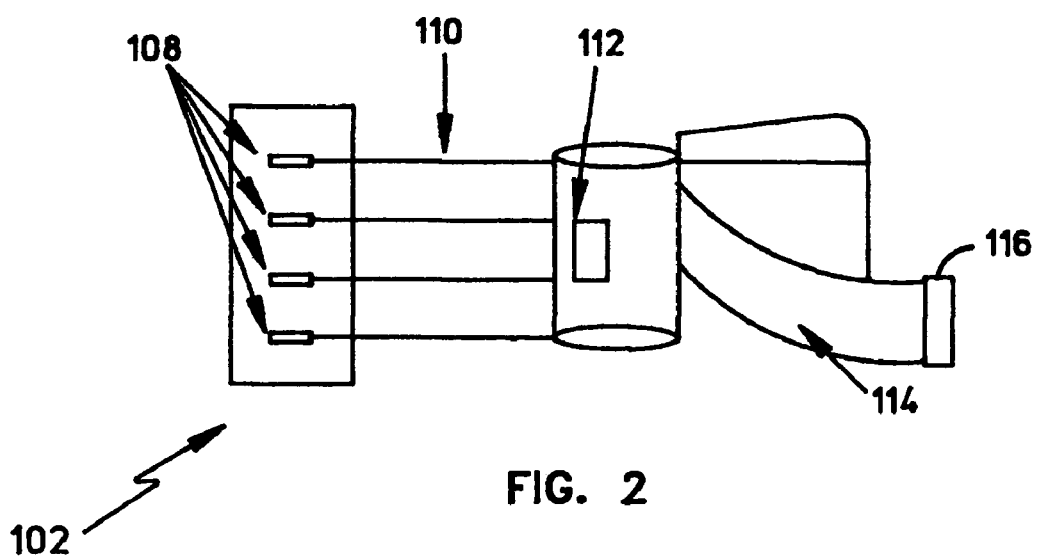
FIG. 2 is a simplified side view of an arm and actuator used in the magnetic storage device of FIG. 1.

FIG. 1 is a simplified top down view of a magnetic storage device 102 (e.g. a disk drive) which is one application in which the present invention may be employed. FIG. 2 provides a side view of an arm and actuator used in the same device 102. Magnetic storage device 102 includes read sensors 108 of a read/write head, a magnetic disk 106 (one type of data storage medium), a read/write integrated circuit (R/W IC) 112, a suspension interconnect 110, a flex cable 114, and an enclosure connector 116, all of which are contained and carried within a housing enclosure 104 (FIG. 1 only). As illustrated more clearly in FIG. 2, magnetic storage device 102 may actually include multiple read sensors 108 and associated magnetic disks 106 and suspension interconnects 110.

Read sensors 108 of a read/write head are used for reading magnetic data signals from disk 106. Each read sensor 108 may be any suitable transducer, such as a magnetoresistive (MR) sensor or a giant magnetoresistive (GMR) sensor in this particular application. Read sensors 108 are coupled to an input of R/W IC 112, which generally includes read signal processing circuitry. The read signal processing circuitry includes circuitry which biases read sensors 108 with fixed direct current (DC) bias voltages or current, amplifies signals read from disk 106, and provides for further signal processing. Read sensors 108 are coupled to R/W IC 112 through suspension interconnect 110, which is primarily carried along an actuator arm of device 102. Suspension interconnect 110 generally includes electrical conductors (e.g. copper alloy traces etched upon an insulator) which extend along the actuator arm. A first end of flex cable 114 is coupled to R/W IC 112, and a second end of flex cable 114 is coupled to enclosure connector 104. In general, the resistance of read sensors 108 changes in response to changing magnetic flux orientations on magnetic disk 106. The changes in resistance of read sensors 108 translate into a varying analog electrical signal which is received and processed by R/W IC 112. Processed analog signals from R/W IC 112 are carried through flex cable 114 and out through enclosure connector 116. The processed analog signals are ultimately converted into digital data. In this general fashion, magnetic storage device 102 is able to read data from disk 106 at a relatively high data rate. High data rates are deemed to be data rates that exceed 500 megabits per second (Mps).

Without appropriate circuitry in the read signal processing circuitry of R/W IC 112, too much interference would be added during the reading and amplification of the signals from read sensors 108. Such interference would ultimately affect the accuracy and cause errors in the data being read from magnetic disk 16. One such interference source is electronic circuitry that drives a spindle motor (not shown) for rotating disk 106. Also, transmission line interference pick-up effects of suspension interconnect 110 during high data rate operation may undesirably influence the spectral content of the read signal.

Figure 3:
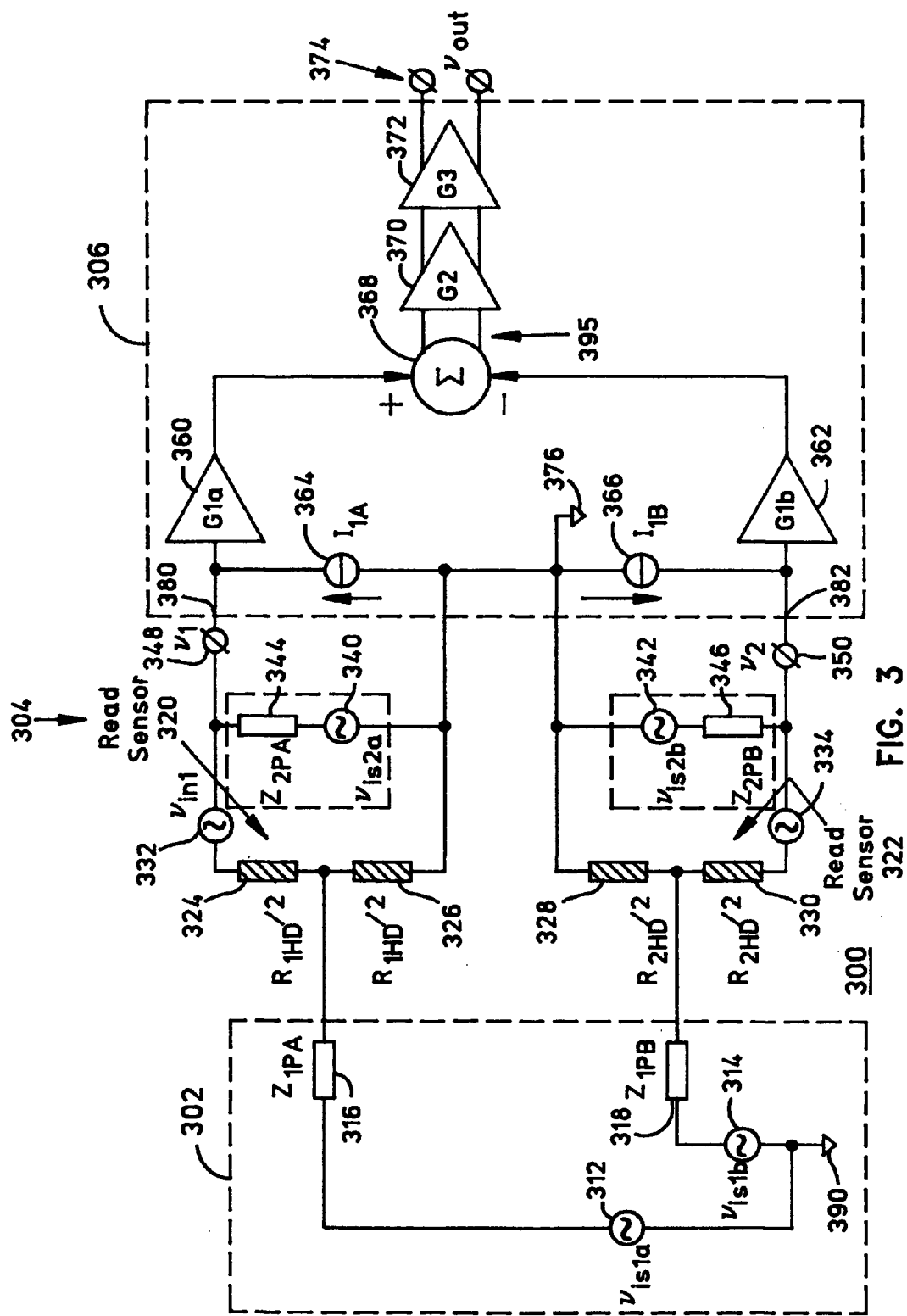
FIG. 3 is a schematic diagram of a preamplifier circuit according to the present invention, which may be employed in the magnetic storage device of FIGS. 1–2.

FIG. 3 is a schematic diagram of electrical circuitry 300 which includes a preamplifier circuit 306 of the present invention. Preamplifier circuit 306 is suitable for use in connection with read sensors in a magnetic storage device (e.g. a disk drive), such as magnetic storage device 102 previously described in relation to FIGS. 1–2. Preamplifier circuit 306 is preferably embodied in an integrated circuit (IC), such as R/W IC 112 shown and described in relation to FIGS. 1–2. Although the application described herein is for a magnetic storage device, such preamplifiers 306 are appropriate for any suitable single-ended multiple-input port preamplifier application.

What is now described is the specific environment within which preamplifier circuit 306 is utilized. Magnetic disk interference components (e.g. disk 106 and the spindle motor of FIGS. 1–2) are characterized by a disk equivalent circuit 302, whereas read sensors and their associated coupling (e.g. read sensors 108 and suspension interconnect 110 of FIGS. 1–2) are characterized by a sensor coupling equivalent circuit 304. As shown, preamplifier circuit is coupled to disk interference equivalent circuit 302 through sensor coupling equivalent circuit 304. Interference components from disk equivalent circuit 302 are represented by interference voltage sources 312 and 314 ($v_{is1a}$ and $v_{is1b}$, respectively) which correspond to interference signals from the disk spindle motor which are present on the disk spindle. Each interference voltage source 312 and 314 has a first end coupled to a reference voltage 390 (e.g. ground) and a second end coupled to a corresponding air bearing impedance 316 or 318 (impedance $Z_{1PA}$ or $Z_{1PB}$).

Two read sensors 320 and 322 of a read/write head are utilized with each magnetic disk. Components associated with read sensor 320 will be described first. Read sensor 320 has a resistance of $R_{1HD}$ and is represented by two series-coupled resistors 324 and 326 each having a resistance of $R_{1HD}/2$. Disk equivalent circuit 302 is coupled to sensor coupling equivalent circuit 304 from impedance 316 being coupled in between resistors 324 and 326 at first ends thereof. Read signals sensed by read sensor 320 are represented by a sensor signal voltage source 332 which has a first end coupled to a second end of resistor 324. Interference components are represented by an interference voltage source 340 ($v_{is2a}$) and a parasitic impedance 344 ($Z_{2PA}$) which are coupled in series. Such interference components represent those due to front-end electronic packaging (e.g. suspension interconnect 110 of FIGS. 1–2) having inherent parasitic interference pick-up elements. The series-coupled voltage source 340 and parasitic impedance 344 are together coupled in parallel between a second end of sensor signal voltage source 340 and a second end of resistor 326.

Similarly, read sensor 322 has a resistance of $R_{2HD}$ and is represented by two series-coupled resistors 328 and 330 each having a resistance of $R_{2HD}/2$. Disk interference equivalent circuit 302 is further coupled to sensor coupling equivalent circuit 304 from impedance 318 being coupled in between resistors 328 and 330 at first ends thereof. Read signals sensed by read sensor 322 are represented by a sensor signal voltage source 334 which has a first end coupled to a second end of resistor 330. Interference components are represented by an interference voltage source 342 ($v_{is2b}$) and a parasitic impedance 346 ($Z_{2PB}$) which are coupled in series. Such interference components represent those due to the front-end electronic packaging (e.g. suspension interconnect 110 of FIGS. 1–2) having inherent parasitic interference pick-up elements. The series-coupled voltage source 342 and parasitic impedance 346 are together coupled in parallel between a second end of sensor signal voltage source 334 and a second end of resistor 328.

Preamplifier circuit 306 may be referred to as an active common-mode cancellation (ACC), single-ended (SE) preamplifier. Preamplifier circuit 306 includes sensor bias sources 364 and 366 (with fixed currents $I_{1A}$ and $I_{1B}$, respectively), amplifiers 360 and 362 of a first amplifier gain stage (with gains G1a and G1b, respectively), a subtractor 368, an amplifier 370 of a second amplifier gain stage (with gain G2), and an amplifier 372 of a third gain stage (with gain G3). Preamplifier circuit 306 also has two input ports which include a first input port 380 and a second input port 382, as well as a single output port 374 ($v_{out}$). Amplifier 360 has an input coupled to first input port 380 and an output coupled to a first input of subtractor 368. Similarly, amplifier 362 has an input coupled to second input port 382 and an output coupled to a second input of subtractor 368. Subtractor 368 has an output 395 which provides a difference signal between signals at its first and second inputs. Output 395 is coupled to an input of amplifier 370 (G2), which has an output which is coupled to an input of amplifier 372 (G3). Output 374 of amplifier 372 provides the output 374 of preamplifier circuit 306.

First input port 380 of preamplifier circuit 306 is coupled to read sensor 320, whereas second input port 382 of preamplifier circuit 306 is coupled to read sensor 322. For read sensor 320, first and second ends of sensor bias source 364 are coupled across first input port 380 in parallel with read sensor 320. In the equivalent circuit, sensor bias source 364 is coupled in parallel with sensor signal voltage source 332 and resistors 324 and 326 (as well as with the series-coupled interference voltage source 340 and parasitic impedance 344. For read sensor 322, first and second ends of sensor bias source 366 are coupled across second input port 382 in parallel with read sensor 322. In the equivalent circuit, sensor bias source 366 is coupled in parallel with sensor signal voltage source 334 and resistors 328 and 330 (as well as with the series-coupled interference voltage source 342 and parasitic impedance 346). One end of each sensor bias source 364 and 366 is coupled to a reference voltage 376 (e.g. ground). Note that, although sensor bias sources 364 and 366 are represented as fixed current sources, they alternatively may be controlled to provide a constant voltage bias. Equivalently, the fixed current sources may be constructed with a series connection of a voltage source and resistor.

Sensor bias source 364 has its fixed current $I_{1A}$ appropriately set in order to actively bias read sensor 320 so that it may sense magnetic flux changes on the disk surface. A voltage $v_1$ 348 represents this resulting sensor signal, as well as interference signals, present at input port 380 of preamplifier circuit 306. Biased as such, input port 380 may be referred to as a "selected" input port of preamplifier circuit 306. On the other hand, sensor bias source 366 has its fixed current $I_{1B}$ appropriately set in order to zero bias read sensor 322 so that it is incapable of sensing the magnetic flux changes on the disk surface. Although read sensor 322 is incapable of sensing these magnetic flux changes, it is still capable of sensing interference signals. A voltage $v_2$ 350 represents this interference signal at input port 382 of preamplifier circuit 306. Biased as such, input port 382 may be referred to as an "unselected" input port of preamplifier circuit 306.

Since voltage $v_1$ 348 represents both the sensor signal and interference signal, and voltage v2 350 represents only the interference signal, their difference results in a sensor signal that is substantially free from interference. Subtractor 368 receives these signals at its inputs and provides such a difference signal at its output 395. Prior to being input to subtractor 368, voltages $v_1$ 348 and $v_2$ 350 are amplified equally by amplifiers 360 and 362, respectively, which have equivalent gains G1a and G2b.

Figure 4:
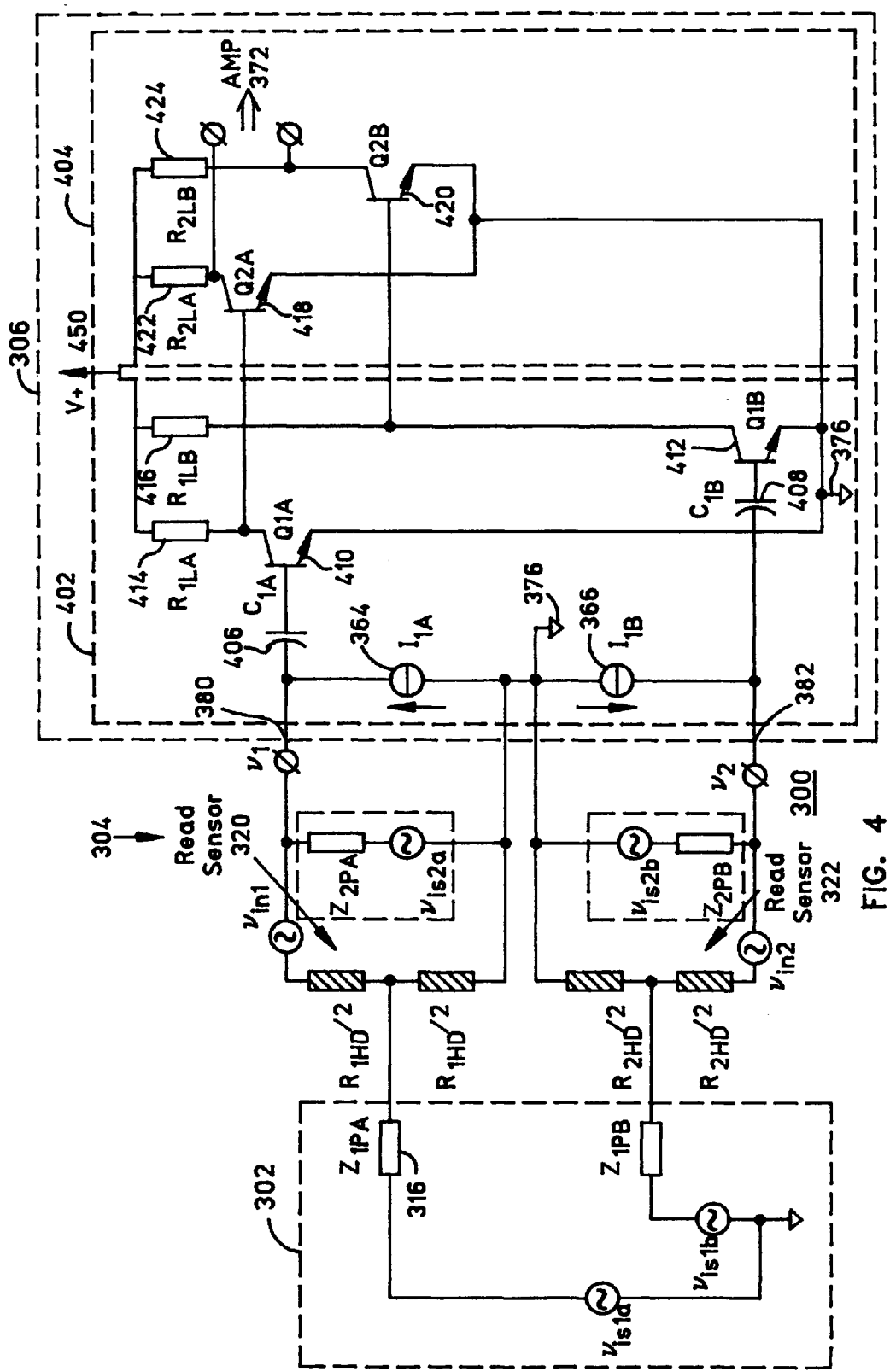
FIG. 4 is the schematic diagram of the preamplifier circuit of FIG. 3 except with additional detail regarding amplifier and subtraction stages.

FIG. 4 shows more circuit detail for the subtractor and amplifier gain stages. A transistor 410 (Q1A) (amplifier 360 of FIG. 3) has a base input coupled to input port 380 through an AC coupling capacitor 406 ($C_{1A}$), a collector output coupled to a reference voltage 450 (V+) through resistor 414 ($R_{1LA}$), and an emitter coupled to reference voltage 376 (ground). Similarly, a transistor 412 (Q1B) (amplifier 362 of FIG. 3) has a base input coupled to input port 382 through an AC coupling capacitor 408 ($C_{1B}$), a collector output coupled to reference voltage 450 (V+) through resistor 416 ($R_{1LB}$), and an emitter coupled to reference voltage 376 (ground).

A transistor 418 (Q2A) (part of amplifier 370 of FIG. 3) has a base input coupled to the collector output of transistor 410, a collector output coupled to reference voltage 450 (V+) through resistor 422, and an emitter coupled to reference voltage 376 (ground). Similarly, a transistor 420 (Q2B) (part of amplifier 370 of FIG. 3) has a base input coupled to the collector output of transistor 412, a collector output coupled to reference voltage 450 (V+) through resistor 424, and an emitter coupled to reference voltage 376 (ground). The collector outputs of transistors 418 and 420 are similarly coupled to base inputs of similar transistors in amplifier 372.

AC coupling capacitors 406 and 408 allow transistors 410 and 412 to be biased separately from each sensor bias sources 364 and 366. The bias current for transistors 410 and 412 may be substantially equivalent, such that gains G1a and G1b are substantially equivalent. In this embodiment, the subtraction stage and the second gain stage (G2) functions are combined and constructed using transistors 418 and 420 and resistors 422 and 424. Although detailed circuits for transistor biasing are not shown, it is well within the scope of one skilled in the art to be able to construct such transistor biasing circuitry for the common-emitter transistor amplifiers (G1a and G1b, 360 and 362) and the common-emitter pair (subtractor 368).

Transfer equations for each interference source at input ports 380 and 382 are based on the following assumptions. Impedances $Z_{1PA}$ and $Z_{1PB}$ are high in impedance relative to that of read sensors 320 and 322 ($R_{1HD}$ and $R_{2HD}$). A similar situation exists for parasitic impedances $Z_{2PA}$ and $Z_{2PB}$. Therefore, the interference sources operate more as current sources into input ports 380 and 382 and may be expressed as:

$$i_{is1a} = v_{is1a}/Z_{1PA}, i_{is1b} = v_{is1b}/Z_{1PB}, i_{is2a} = v_{is2a}/Z_{2PA} \text{ and }$$
$$i_{is2b} = v_{is2b}/Z_{2PB}$$

Similarly, an input impedance ($R_{in}$) for each of input ports 380 and 382 may be considered to be much larger than that of read sensors 320 and 322 (i.e. $R_{1HD}$ and $R_{2HD}$) to develop the mathematical expressions:

$$v_1 \cong \frac{i_{is1a}R_{1HD}}{2} + i_{is2a}R_{1HD} \qquad \text{Equation 1}$$

$$v_2 \cong \frac{i_{is1b}R_{2HD}}{2} + i_{is2b}R_{2HD} \qquad \text{Equation 2}$$

Due to manufacturing tolerances, resistances $R_{1HD}$ and $R_{2HD}$ of read sensors 320 and 322 may be slightly mismatched. Due to this mismatch, the subtraction of $v_2$ from $v_1$ may not result in a complete cancellation of the common-mode interference. However, the interference cancellation can be improved by providing a controllable variable gain for at least one of the first stage amplifiers (G1a or preferably G1b) to set it at an appropriate fixed value prior to steady-state operation.

Figure 5:
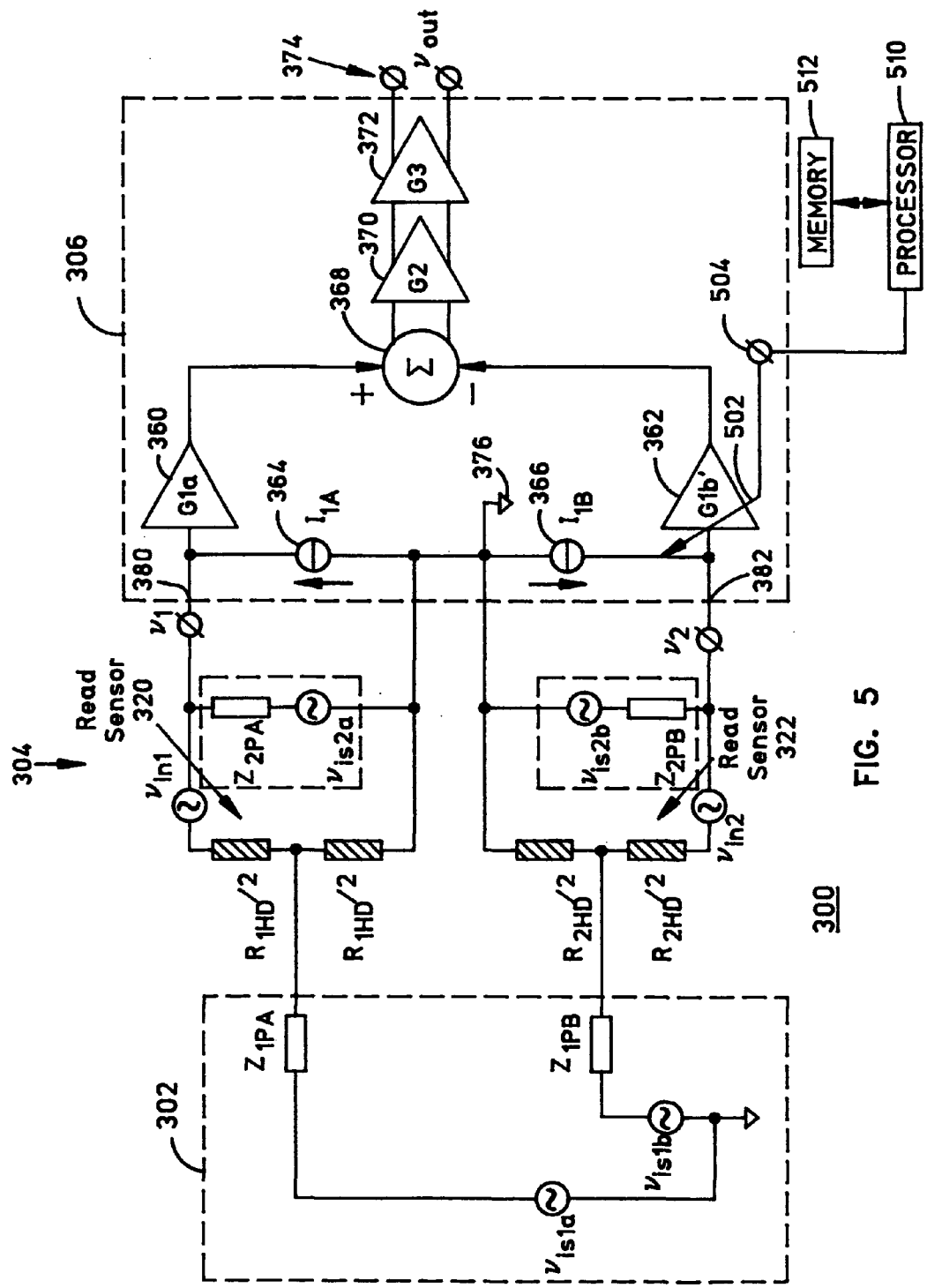
FIG. 5 is the schematic diagram of the preamplifier circuit of FIG. 3 with an additional controllable bias for more accurately canceling the interference signal despite mismatches in component values.

FIG. 5 is the schematic diagram of the preamplifier circuit of FIG. 3 with a controllable variable bias 502 for a more accurate canceling of interference signals. In FIG. 5, it is shown that only input port 382 (e.g. the zero-biased port) is configured for such a controllable bias. By accurately setting a bias voltage 504 for bias/gain of amplifier 362 (G1b'), the interference subtraction/cancellation is tuned to more precisely reduce or eliminate the interference signal to consider component tolerance variation.

Based on the above, Equation 2 can be rewritten such that $R_{2HD}$ is in terms of $R_{1HD}$ multiplied by a mismatch factor K:

$$v_2 \cong \frac{i_{is1a} K R_{1HD}}{2} + i_{is2a} K R_{1HD} \qquad \text{Equation 3}$$

The following expression reveals the final common-mode interference voltage output:

$$V_{out} = G2G3(G1a - KG1b)\left(\frac{i_{is1a} R_{1HD}}{2} + i_{is2a} R_{1HD}\right) \qquad \text{Equation 4}$$

Differences in the read sensor's resistance values $R_{1HD}$ and $R_{2HD}$ can be determined from the known measured resistance values which are stored in memory 512 of FIG. 5. The ability to measure a read sensors' resistance is common in commercially available Read/Write ICs. Controlled by a processor 510, memory 512 may be on IC 112 (FIGS. 1–2) or other suitable location in the disk drive system. The gain G1b of amplifier 362 can be adjustably set with G1b'=G1a/K to significantly reduce if not eliminate the common-mode interference signal from the read signal. Alternatively, during an "interference suppression training session" the bias voltage 504 may be set to a value such that no output interference results at output 374. This voltage value can be subsequently stored in a register with use of a digital-to-analog (D/A) converter, for example. While the read sensor is utilized, this previously determined voltage value is applied to the D/A converter which applies the bias voltage 504 for appropriately setting the gain G1b'.

FIG. 6 is a flowchart which describes a method of reducing interference with use of a preamplifier circuit of the present application. This method particularly describes a way of providing gain initialization and/or adjustment so that optimal interference cancellation will occur. The preamplifier circuit utilized may be of the type shown and described in relation to FIGS. 3–5. Beginning at a start block 602 of FIG. 6, the interference power from the first input port is measured (step 604). Interference power is a common measurement for a Channel IC which is connected to the output of a read/write IC. To measure the interference power from the first input port, the read sensor for the first input port is enabled but not biased (i.e. zero-biased) and the subtractor is rendered inoperative by disabling the second port G1b gain stage. Next, the interference power from the second input port is measured (step 606). To measure the interference power from the second input port, the read sensor for the second input port is enabled but not biased (i.e. zero-biased) and the subtractor is rendered inoperative by disabling the first port G1a gain stage. Next, the K factor for gain G1b is determined based on these measured interference power values (step 608) (e.g. see above equations). This K factor is saved and utilized for steady-state operation. Next, the preamplifier circuit is made operative for common-mode cancellation in steady-state disk drive operation (step 610). Here, both the first and the second input ports are enabled, the subtractor is enabled, the first read sensor is biased appropriately, and the second read sensor is zero-biased. Note that, although interference powers were described as being utilized for determining the K factor, data-error rates may be measured as an alternative to achieve the same result.

Final Comments. As described herein, a preamplifier circuit has a first input port which is configured to receive a first signal which includes a read sensor data signal and an interference signal; a second input port which is configured to receive a second signal which includes the interference signal but not the read sensor data signal; and a subtractor having first and second inputs coupled to the first and the second input ports and an output which provides a read sensor signal substantially without the interference signal. Preferably, the preamplifier circuit is embodied in an integrated circuit (IC) of a disk drive. A method of the present application for reducing interference in a read sensor signal includes the steps of receiving a first signal which includes a read sensor data signal and an interference signal; receiving a second signal which includes the interference signal but not the read sensor data signal; and subtracting the second signal from the first signal to provide a read sensor signal without the interference signal. A magnetic storage device of the present application (e.g. a disk drive) includes at least one magnetic disk; a magnetic head which includes first and second read sensors; a suspension which supports the magnetic head relative to the magnetic disk; read circuitry having a preamplifier which includes a first input port coupled to the first read sensor; a second input port coupled to the second read sensor; a subtractor having first and second inputs coupled to the first and the second input ports, respectively; and an output of the subtractor which provides a read sensor signal.

It is to be understood that the above is merely a description of preferred embodiments of the invention and that various changes, alterations, and variations may be made without departing from the true spirit and scope of the invention as set for in the appended claims. Although the present invention was described above in detail for a magnetic storage device, it may be utilized in any suitable electronic device application such as multiport data acquisition instruments. Also, although the transistors utilized in the above circuits were shown and described as bipolar NPN type transistors, any suitable transistor type may be utilized as one skilled in the art will readily understand. Furthermore, a single transistor may be implemented as multiple parallel transistors (in an IC design, for example) and the present invention encompasses such variations. Few if any of the terms or phrases in the specification and claims have been given any special meaning different from their plain language meaning, and therefore the specification is not to be used to define terms in an unduly narrow sense.

What is claimed is:

1. A preamplifier circuit, comprising:
   first and second input ports;
   a first bias source configured to provide a first read sensor current/voltage bias at the first input port for a read operation;
   a second bias source configured to provide a second read sensor current/voltage bias at the second input port for the read operation, the second read sensor current/
voltage bias being zero or negligible;
the first input port configured to receive a first signal
during the read operation which includes a read sensor
data signal and an interference signal;
the second input port configured to receive a second
signal during the read operation which includes the
interference signal but not the read sensor data signal;
and
a subtractor having first and second inputs coupled to the
first and the second input ports, respectively.

2. The preamplifier circuit of claim 1, further comprising:
an output of the subtractor which provides the read sensor
signal substantially without the interference signal.

3. The preamplifier circuit of claim 1, wherein the preamplifier circuit is embodied in an integrated circuit (IC).

4. The preamplifier circuit oi claim 1,
wherein the second read sensor current/voltage bias comprises a zero current/voltage bias.

5. The preamplifier circuit of claim 1, further comprising:
a first amplifier having an input coupled to the first input
port and an output coupled to the first input of the
subtractor; and
a second amplifier having an input coupled to the second
input port and an output coupled to the second input of
the subtractor.

6. The preamplifier circuit of claim 1, further comprising:
a first amplifier having an input coupled to the first input
port and an output coupled to the first input of the
subtractor;
a second amplifier having an input coupled to the second
input port and an output coupled to the second input of
the subtractor; and
wherein a gain of at least one of the first and the second
amplifiers is controllably adjusted so that an output of
the subtractor provides the read sensor signal substantially without the interference signal.

7. The preamplifier circuit of claim 1, further comprising:
a first amplifier which includes a first transistor having a
base coupled to the first input port, a collector coupled
to a first reference voltage through a first resistor, and
an emitter coupled to a second reference voltage; and
a second amplifier which includes a second transistor
having a base coupled to the second input port, a
collector coupled to the first reference voltage through
a second resistor, and an emitter coupled to the second
reference voltage.

8. The preamplifier circuit of claim 1, further comprising:
a first amplifier which includes a first transistor having a
base coupled to the first input port through a first
capacitor, a collector coupled to a first reference voltage through a first resistor, and an emitter coupled to a
second reference voltage;
a second amplifier which includes a second transistor
having a base coupled to the second input port through
a second capacitor, a collector coupled to the first
reference voltage through a second resistor, and an
emitter coupled to the second reference voltage;
a third amplifier which includes a third transistor having
a base coupled to the collector of the first transistor, a
collector coupled to the first reference voltage through
a third resistor, and an emitter coupled to the second
reference voltage;
a fourth amplifier which includes a fourth transistor
having a base coupled to the collector of the second
transistor, a collector coupled to the first reference
voltage through a fourth resistor, and an emitter
coupled to the second reference voltage.

9. A preamplifier circuit, comprising:
first and second input ports;
a first bias source being configured to provide a first
current/voltage bias at the first input port;
a second bias source being configured to provide a second
current/voltage bias at the second input port which is
zero or negligible;
the first input port being configured to receive a first signal
which includes an input signal and an interference
signal while the first input port is set at the first
current/voltage bias;
the second input port being configured to receive a second
signal which includes the interference signal but not the
input signal while the second input port is set at the
second current/voltage bias; and
a subtractor having first and second inputs coupled to the
first and the second input ports, respectively.

10. The preamplifier circuit of claim 9 further wherein:
the second current/voltage bias is zero.

11. The preamplifier circuit of claim 9, further comprising:
a first amplifier having an input coupled to the first input
port and an output coupled to the first input of the
subtractor; and
a second amplifier having an input coupled to the second
input port and an output coupled to the second input of
the subtractor.

12. The preamplifier circuit of claim 9, further comprising:
a first amplifier having an input coupled to the first input
port and an output coupled to the first input of the
subtractor;
a second amplifier having an input coupled to the second
input port and an output coupled to the second input of
the subtractor; and
wherein a gain of at least one of the first and the second
amplifiers is controllably adjusted so that an output of
the subtractor provides the input signal substantially
without the interference signal.

13. The preamplifier circuit of claim 9, further comprising:
a first amplifier which includes a first transistor having a
base coupled to the first input port, a collector coupled
to a first reference voltage through a first resistor, and
an emitter coupled to a second reference voltage; and
a second amplifier which includes a second transistor
having a base coupled to the second input port, a
collector coupled to the first reference voltage through
a second resistor, and an emitter coupled to the second
reference voltage.

14. The preamplifier circuit of claim 9, further comprising:
a first amplifier which includes a first transistor having a
base coupled to the first input port through a first
capacitor, a collector coupled to a first reference voltage through a first resistor, and an emitter coupled to a
second reference voltage;
a second amplifier which includes a second transistor
having a base coupled to the second input port through
a second capacitor, a collector coupled to the first
reference voltage through a second resistor, and an
emitter coupled to the second reference voltage;

a third amplifier which includes a third transistor having a base coupled to the collector of the first transistor, a collector coupled to the first reference voltage through a third resistor, and an emitter coupled to the second reference voltage; and a fourth amplifier which includes a fourth transistor having a base coupled to the collector of the second transistor, a collector coupled to the first reference voltage through a fourth resistor, and an emitter coupled to the second reference voltage.

15. A magnetic storage device, comprising:

at least one magnetic disk;

a magnetic head which includes first and second read sensors;

a suspension which supports the magnetic head relative to the magnetic disk;

read circuitry having a preamplifier which includes:
a first input port coupled to the first read sensor;
a second input port coupled to the second read sensor;
a first bias source configured to provide a first read sensor current/voltage bias at the first input port for read operations;
a second bias source configured to provide a second read sensor current/voltage bias at the second input port for the read operations, the second read sensor current/voltage bias being zero or negligible;
a subtractor having first and second inputs coupled to the first and the second input ports, respectively; and
an output of the subtractor configured to provide a read sensor data signal.

16. The magnetic storage device of claim 15, wherein the preamplifier is embodied in an integrated circuit (IC).

17. The magnetic storage device of claim 15, further comprising:
wherein the first input port is configured to receive a first signal which includes a read sensor data signal and an interference signal; and
wherein the second input port is configured to receive a second signal which includes the interference signal but not the read sensor data signal.

18. The magnetic storage device of claim 15, further comprising:
wherein the first input port is configured to receive a first signal which includes a read sensor data signal and an interference signal;
wherein the second input port is configured to receive a second signal which includes the interference signal but not the read sensor data signal; and
wherein the output of the subtractor is configured to provide the read sensor data signal substantially without the interference signal.

19. The magnetic storage device of claim 15, further comprising:
wherein the second read sensor current/voltage bias is zero;
a first amplifier coupled between the first input port and the first input of the subtractor; and
a second amplifier coupled between the second input port and the second input of the subtractor.

20. The magnetic storage device of claim 15, further comprising:
a first amplifier coupled between the first input port and the first input of the subtractor;
a second amplifier coupled between the second input port and the second input of the subtractor; and
wherein a gain of at least one of the first and the second amplifiers is controllably adjusted so that an output of the subtractor provides the input signal substantially without an interference signal.

21. In a preamplifier circuit, a method of reducing interference in a read sensor signal comprising:
providing an active current/voltage bias for a first read sensor during a read operation;
providing a zero or negligible current/voltage bias for a second read sensor during the read operation;
receiving, from the first read sensor during the read operation, a first signal which includes a read sensor data signal and an interference signal;
receiving, from the second read sensor during the read operation, a second signal which includes the interference signal but not the read sensor data signal; and
subtracting the second signal from the first signal to provide a read sensor signal without the interference signal.

22. The method of claim 21, further comprising:
providing a first amplifier for amplifying the first signal;
providing a second amplifier for amplifying the second signal; and
initializing a gain of the second amplifier to reduce or eliminate the interference signal.

23. The method of claim 21, further comprising:
providing a first amplifier for amplifying the first signal;
providing a second amplifier for amplifying the second signal; and
initializing a gain of one of the first and the second amplifiers by;
measuring a first interference power for the first read sensor;
measuring a second interference power for the second read sensor: and
determining a K factor for the gain based on the first and the second interference powers.

24. The method of claim 21, further comprising:
amplifying the read sensor data signal after subtracting the second signal from the first signal.

25. The method of claim 21, wherein the zero or negligible current/voltage bias comprises a zero current/voltage bias.

26. A preamplifier circuit, comprising:
first and second input ports;
the first input port configured to receive a first signal which includes a read sensor data signal and an interference signal;
the second input, port configured to receive a second signal which includes the interference signal but not the read sensor data signal;
a first bias source which provides a first read sensor current/voltage bias at the first input port;
a second bias source which provides a second read sensor current/voltage bias at the second input port which is zero or negligible;
a first amplifier which includes a first transistor having a base coupled to the first input port through a first capacitor, a collector coupled to a first reference voltage through a first resistor, and an emitter coupled to a second reference voltage;

a second amplifier which includes a second transistor having a base coupled to the second input port through a second capacitor, a collector coupled to the first reference voltage through a second resistor, and an emitter coupled to the second reference voltage;

a subtractor having first and second inputs coupled to the first and the second input ports, respectively; and an output of the subtractor which provides the read sensor signal substantially without the interference signal.

27. The preamplifier circuit of claim 26, which is part of a magnetic storage device having a first read sensor which produces the first signal and a second read sensor which produces the second signal.

* * * * *